United States Patent [19]
Barnes et al.

[11] Patent Number: 5,145,127
[45] Date of Patent: Sep. 8, 1992

[54] WHEELS

[75] Inventors: Raymond H. Barnes, Nuneaton; Nicholas R. P. Lee, Coventry; Trevor C. Wells, Leamington Spa, all of England

[73] Assignee: Dunlop Limited a British Company, United Kingdom

[21] Appl. No.: 653,272

[22] Filed: Feb. 11, 1991

[30] Foreign Application Priority Data

Feb. 13, 1990 [GB] United Kingdom ............... 9003216

[51] Int. Cl.$^5$ .............................................. B64D 45/00
[52] U.S. Cl. .............................. 244/103 R; 250/227.15; 340/550; 301/63 DS
[58] Field of Search ............... 244/1 R, 129.1, 103 R; 250/227.15, 562, 572; 340/550, 555, 960; 301/63 DS, 63 PW, 63 R, 37 R, 37 P, 37 AT; 356/237, 73.1

[56] References Cited

U.S. PATENT DOCUMENTS

| | | | |
|---|---|---|---|
| 3,707,270 | 12/1972 | Laimins | 244/103 R |
| 3,712,680 | 1/1973 | Hyland et al. | 301/63 DS |
| 4,367,460 | 1/1983 | Hodara | 250/227.15 |
| 4,538,527 | 9/1985 | Kitchen | 340/550 |
| 4,603,252 | 7/1986 | Malek et al. | 250/227.14 |
| 4,629,318 | 12/1986 | Malek et al. | |
| 4,692,610 | 9/1987 | Szuchy | 250/227.14 |
| 4,808,814 | 2/1989 | Hofer et al. | 250/227.15 |
| 4,812,645 | 3/1989 | Griffiths | 250/227.15 |

FOREIGN PATENT DOCUMENTS

| | | |
|---|---|---|
| 0036782 | 9/1981 | European Pat. Off. |
| 0071695 | 2/1983 | European Pat. Off. |
| 0150268 | 8/1985 | European Pat. Off. |
| 1374988 | 11/1974 | United Kingdom |
| 2005036 | 4/1979 | United Kingdom |
| 2029019 | 3/1980 | United Kingdom |
| 1601341 | 10/1981 | United Kingdom |
| 1602751 | 11/1981 | United Kingdom |
| 2124784 | 2/1984 | United Kingdom |
| 2136119 | 9/1984 | United Kingdom |

Primary Examiner—Galen Barefoot
Attorney, Agent, or Firm—Stevens, Davis, Miller & Mosher

[57] ABSTRACT

To monitor for the formation of a crack in a metal wheel such as that of an aircraft tire and wheel assembly the wheel is provided with an optical fiber arranged to extend no-rectilinearly in a position of the wheel surface selected to be preferential for the development of a crack; preferably the preferential region for crack development is the tire bead seat region and the optical fiber is arranged to extend non-rectilinearly around the circumference of the tire bead seat region thereby to lie interposed between the wheel and tire.

14 Claims, 1 Drawing Sheet

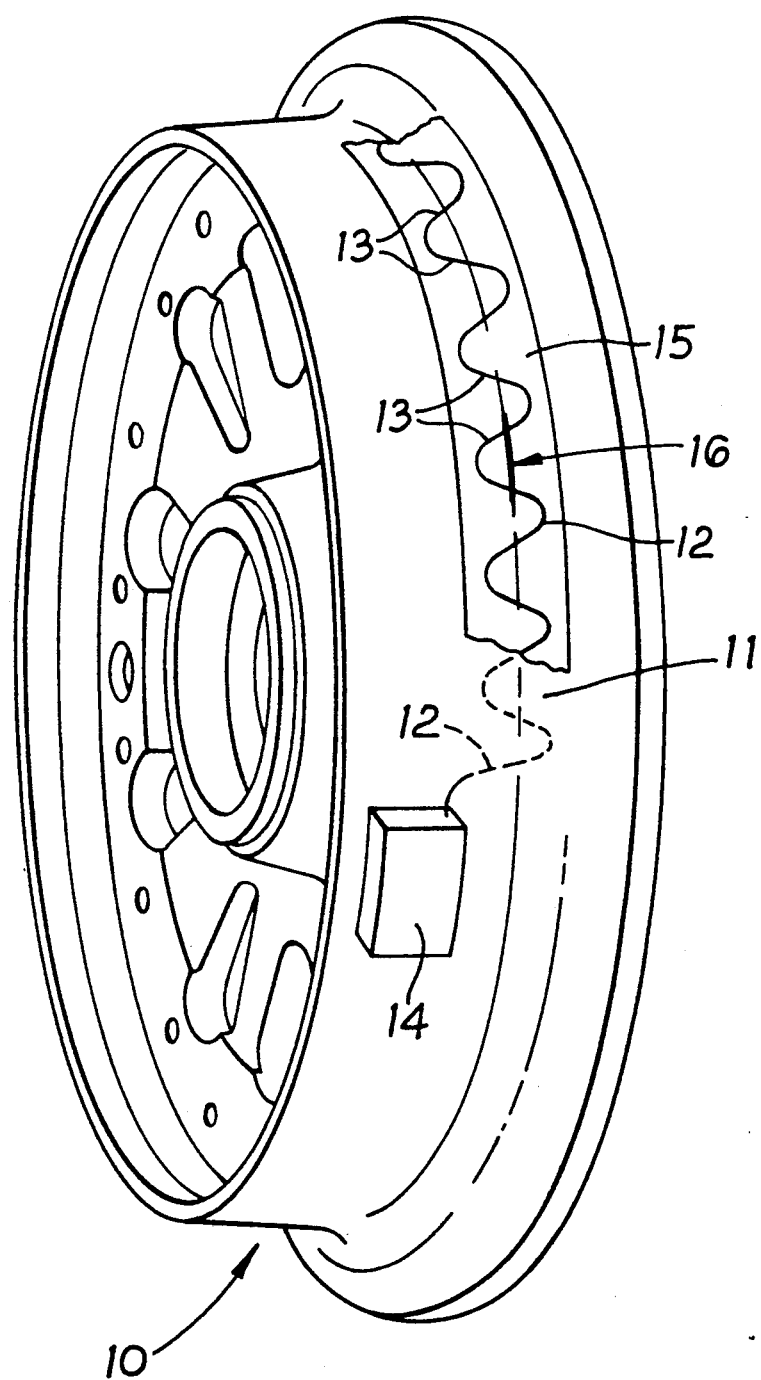

WHEELS

BACKGROUND OF THE INVENTION

This invention relates to a method of monitoring for the formation of a crack in a metal wheel, such as the wheel of an aircraft wheel and brake assembly of an aircraft landing gear, a wheel or tire and wheel assembly adapted for use in the method of the invention and a method of forming a wheel adapted for use in the method of the invention.

It is a well established practice in operation of aircraft to conduct regular inspection of components to ensure that they are free from significant defects, including cracks, and are safe for a further period of service. This inspection often necessitates removal of components or assemblies, dismantling and subsequent re-assembly and refitting to the aircraft. Typically the inspection entails a non-destructive type testing procedure, e.g. involving ultrasonic, eddy current or penetrant dye methods, and even in the case of components that do not need to be removed or dismantled for inspection the in situ performance of one of these types of test procedure usually is not convenient.

A particular problem arises in respect of periodic checking of the cast or forged metal wheels of aircraft tire and wheel assemblies to detect any cracks which may be developing. Commonly cracks occur in a part of the wheel which is normally obscured by the tire. Hence checking for cracks generally involves removal of the tire-wheel assembly from the brake assembly and subsequent removal of the tire from the wheel in order that all surfaces of the wheel may be inspected.

BRIEF DESCRIPTION OF THE INVENTION

The present invention seeks to overcome or mitigate the aforedescribed difficulties and in accordance with one of its aspects there is provided a method of monitoring for the formation of a crack in a normally obscured part of a metallic wheel of a tire and wheel assembly comprising providing on or embedded in said normally obscured surface region an optical fiber responsive to formation of a crack in said surface, said optical fiber being arranged to extend in a non-rectilinear manner at said surface region, at a position thereof which is preferential for the development of a crack, inflating a tire whereby it is secured to and retained by said wheel in a manner in which said sensing element is obscured, providing a light source and light detector respectively to direct light to and receive light from said optical fiber and operating said source and detector whereby a break in the continuity of the optical fiber may be detected.

In another of its aspects the present invention provides a metallic wheel, such as an aircraft wheel, of a material potentially prone to develop a crack, said wheel having on its surface or embedded in a surface region thereof an optical fiber which extends non-rectilinearly over said surface region at a position thereof which is preferential for the development of a crack, and said fiber being arranged to allow light to be directed into an end of the fiber and to be received from said or another end of the fiber.

Preferably the method and wheel of the invention provide that in the position of the surface region for the preferential development of a crack any such crack will develop preferentially in a specified direction.

In yet another of its aspects the present invention provides a method of forming a metallic wheel adapted for being subject to a crack detection procedure comprising designing the wheel to have at least one surface region at which cracks will develop preferentially and in a preferential direction, and forming said wheel with an optical fiber which extends non-rectilinearly on said surface region or embedded in the wheel in said surface region, said optical fiber being arranged to extend at least in part in a direction substantially perpendicular to said preferential direction of crack formation.

The invention further teaches that the optical fiber may extend in a non-rectilinear manner, such as a zig-zag or wave-like, e.g. sinusoidal, pattern. A plurality of optical fibers or portions of the length of an optical fiber may be arranged to extend side-by-side at said surface region, and may be arranged substantially parallel to one another.

Preferably the optical fiber extends in a tire bead seat region of the wheel and more preferably that region of the wheel is arranged to be the region at which cracks preferentially tend to develop. It is further observed that the cracks develop in a circumferential direction in the bead seat region and that optical fiber portions extend substantially parallel to one another and to the longitudinal axis of the wheel. The bead seat region may be curved as considered in a cross-sectional plane which contains the longitudinal axis of the wheel and the optical fiber may be arranged to conform to that curvature.

The optical fiber may be applied to a wheel surface as part of a pre-formed strip. That strip may comprise also a layer of material which acts as a guide to locate the optical fiber(s) in a non-rectilinear orientation and/or act as a protective sheath layer such that when secured to a wheel surface the fibers are protected from direct contact by the tire and possible abrasion. The strip may be of a closely toleranced thickness whereby when located at a tire bead seat region the layer of strip material provides a bead seat surface of an accurate dimension for co-operating with a tire bead to result in the conventional air-tight interference fit between the tire and wheel.

The optical fiber may be used in a continuous manner during use of the wheel, the term 'continuous' including continuous periodic use on an automatic basis at pre-scribed intervals of time. Thus the wheel may be provided with, or have associated therewith, a light source and receiver together with transducer means (which may have a power source integral therewith) for providing a signal which enables a break or occurrence of a break in the fiber to be determined by an operator. In the case of a tire and wheel assembly one or more of the transducer means, power source, the light source and the light receiver may be situated within the tire envelope. The transducer means may be of a kind which provides, say, a radio frequency signal; more generally it may create a detectable signal in the form of for example an electromagnetic wave. The transducer may be of a kind carried by a wheel of an aircraft and operable to initiate a warning signal on the aircraft flight deck.

The optical fiber may be used for periodic checking for cracks. In that case the wheel need not be provided with, or have associated therewith, a light source and receiver together with transducer means and power source. Said sources, receiver and transducer may be part of a test unit selectively positionable for co-operation with the wheel to investigate whether any break has occurred in the optical fiber. The test unit may be used to check the optical fiber when the wheel is in situ on an aircraft or when the wheel is removed from an aircraft but without any need to dismantle the wheel.

The optical fiber may be subject to a pulsed beam of light whereby the position of a crack may be determined for example by time of flight measurements in the monitoring system.

BRIEF DESCRIPTION OF THE DRAWING

One embodiment of the present invention will now be described, by way of example, with reference to the accompanying drawing which is a perspective view of half of a two-part aircraft wheel.

DETAILED DESCRIPTION OF A PREFERRED EMBODIMENT

The aircraft wheel part 10 is of a conventional cast or forged alloy construction except that its design is such that if any cracks are likely to develop they will first develop in the outer bead support region 11 and will tend to extend circumferentially. That bead support region has an optical fiber 12 firmly secured thereto, for example with an epoxy resin. The fiber is arranged non-rectilinearly to extend to and fro with a series of substantially axially extending portions 13 which span the region in which cracks 16 will preferentially form in a circumferential direction. Ends of the fiber are connected to a control monitor 14 which incorporates a light source, light receiver, power supply, and a transducer. The light source is controlled to generate a pulse of light at intervals, say hourly, and monitor means checks that the pulse is received properly by the light receiver, the monitor means causing the transducer means to generate a warning signal in the event that the pulse is not received properly.

The optical fiber(s) may be applied to the surface of a wheel by first being laid on and secured to a support member, such as a backing tape 15, which is then secured to a surface of the wheel, preferably to extend fully around the wheel circumference. The optical fiber(s) generally may be arranged to be sandwiched between the support member and wheel surface but alternatively, and especially if the support member itself is relatively inelastic, the support member may be arranged between the optical fiber and wheel surface.

Equivalents of optical fibers may be employed. Thus other light transmitting means are to be understood as falling within the scope of the invention and the references to optical fiber(s) are to be construed accordingly.

What we claim is:

1. Method of monitoring for the formation of a crack in a normally obscured part of a metallic wheel of an aircraft tire and wheel assembly comprising
    providing on at least the tire bead seat region of said normally obscured surface region an optical fiber responsive to formation of a crack in said surface, said optical fiber being arranged to extend in a non-rectilinear manner at said surface region, at least at a position thereof which is preferential for the development of a crack,
    inflating a tire whereby it is secured to and retained by said wheel in a manner in which said sensing element is obscured,
    providing a light source and light detector respectively to direct light to and receive light from said optical fiber,
    providing a test unit which is selectively positionable for cooperation with the wheel when the wheel is at rest to investigate whether a break has occured in said optical fiber, said test unit comprising at least one of said light source and light detector, and operating said source and detector whereby a break in the continuity of the optical fiber may be detected by the test unit.

2. Method according to claim 1 wherein a plurality of optical fibers or portions of the length of an optical fiber are arranged to extend side-by-side at said surface region.

3. Method according to claim 2 wherein portions of the length of an optical fiber extend substantially parallel to one another and to the longitudinal axis of the wheel.

4. Method according to claim 2 wherein an optical fiber extends around at least a part of a wheel in a to and fro manner such as in a zig-zag or sinusoidal lay.

5. Method according to claim 1 wherein the wheel is arranged to develop a crack which extends preferentially in a circumferential direction of the wheel.

6. Method according to claim 1 wherein the optical fiber is positioned at a radially outward facing wheel surface at a position which is curved as considered in a cross-sectional plane which contains the longitudinal axis of the wheel.

7. Method according to claim 1 wherein each of said light source and receiver and transducer means are comprised by said test unit.

8. An aircraft wheel for a pneumatic tire and of a metallic material potentially prone to develop a crack, said wheel having at least one surface region which is obscured when a tire is fitted to the wheel and at which cracks will develop preferentially and in a preferential direction, and provided on said surface region an optical fiber which extends non-rectilinearly over said surface region at at least the tire bead seat region and at a position which is preferential for the development of a crack, said fiber being arranged to allow light to be directed into an end of the fiber and to be received from said end or another end of the fiber.

9. A wheel according to claim 8 wherein the wheel is adapted to contain a multi-disc brake assembly.

10. Method of forming a metallic wheel adapted for being subject to a crack detection procedure comprising designing the wheel to have at least one surface region at which cracks will develop preferentially and in a preferential direction in a surface which is obscured when a tire is fitted to the wheel, and forming said wheel with an optical fiber which extends non-rectilinearly on said surface of the wheel at said surface at at least the tire bead seat region, said optical fiber being arranged to extend at least in part in a direction substantially perpendicular to said preferential direction of crack formation.

11. Method according to claim 10 wherein the optical fiber is applied to the wheel surface as a pre-formed strip.

12. The invention of claim 11 wherein said strip comprises a layer of material which acts as a guide to locate the optical fibers in a non-rectilinear orientation.

13. The invention of claim 11 wherein said strip comprises a layer of material which acts as a protective 14. The invention of claim 13 wherein the strip is located on the wheel at a tire bead seat region to provide a surface to which a tire bead may be fitted.

* * * * *